United States Patent

Hatano et al.

[11] Patent Number: 5,917,617
[45] Date of Patent: Jun. 29, 1999

[54] COMMUNICATION APPARATUS FOR TRANSMITTING AND RECEIVING INFORMATION

[75] Inventors: Yasuhiro Hatano, Ebina; Atsushi Umino, Chigasaki; Eiji Kurosawa, Ueda; Kanehiro Kawakami, Fujisawa, all of Japan

[73] Assignee: Matsushita Graphic Communications, Inc., Tokyo, Japan

[21] Appl. No.: 08/754,320

[22] Filed: Nov. 21, 1996

[30] Foreign Application Priority Data

Dec. 20, 1995 [JP] Japan .................................. 7-331444

[51] Int. Cl.⁶ .............................. H04N 1/024; H04N 1/04; B65H 3/06
[52] U.S. Cl. ......................... 358/498; 358/472; 358/474; 358/496; 271/109
[58] Field of Search ..................................... 358/400, 401, 358/498, 496, 471, 473, 474, 482, 483, 494, 472; 271/109, 127, 245

[56] References Cited

U.S. PATENT DOCUMENTS

| 4,518,975 | 5/1985 | Kawahara et al. | 346/153.1 |
|---|---|---|---|
| 4,748,516 | 5/1988 | Harano et al. | 358/296 |
| 5,014,135 | 5/1991 | Ijuin et al. | 358/296 |
| 5,077,618 | 12/1991 | Sakai et al. | 358/498 |
| 5,270,841 | 12/1993 | Watanabe | 358/496 |
| 5,278,677 | 1/1994 | Lee et al. | 358/498 |
| 5,327,250 | 7/1994 | Ikeda | 358/498 |
| 5,337,165 | 8/1994 | Riousset et al. | 358/496 |
| 5,452,098 | 9/1995 | Sato et al. | 358/496 |
| 5,523,848 | 6/1996 | Musso et al. | 358/498 |

FOREIGN PATENT DOCUMENTS 61-133756  6/1986  Japan .

Primary Examiner—Edward L. Coles
Assistant Examiner—Mark Wallerson
Attorney, Agent, or Firm—Pollock, Vande, Sande & Amernick

[57] ABSTRACT

A communication apparatus for information comprises a recording roller for feeding a recording paper. A line-type recording head is operative for recording an image on the recording paper. Normally, the recording head presses the recording paper against the recording roller. A first releasing mechanism is operative for allowing relative movement of the recording head and the recording roller away from each other. A reading roller is operative for feeding a document sheet. A reading head is operative for reading information from the document sheet. The reading head is located near the recording head. Normally, the reading head presses the document sheet against the reading roller. A second releasing mechanism is operative for allowing relative movement of the reading head and the reading roller away from each other. First and second side plates are located respectively at opposite sides of the recording roller, the recording head, the reading roller, and the reading head. The recording head has a length smaller than a length of the reading head. The recording head is closer to the first side plate than the second side plate. The first releasing mechanism is located between the recording head and the second side plate.

2 Claims, 8 Drawing Sheets

COMMUNICATION APPARATUS FOR TRANSMITTING AND RECEIVING INFORMATION

BACKGROUND OF THE INVENTION

1. Field of the Invention

This invention generally relates to a communication apparatus such as a facsimile apparatus. This invention also relates to a small-sized communication apparatus.

2. Description of the Prior Art

In general, facsimile apparatuses have an image scanning section and an image printing section. In most of conventional facsimile apparatuses, an image scanning section and an image printing section are remote from each other for some reasons so that the size of an apparatus body tends to be great.

Japanese published unexamined patent application 61-1133756 discloses an image forming device in which an image scanning portion and an image printing portion are close to each other to provide a small-sized device body.

SUMMARY OF THE INVENTION

It is an object of this invention to provide an improved communication apparatus for transmitting and receiving information.

A first aspect of this invention provides a communication apparatus for transmitting and receiving information which comprises a recording roller for feeding a recording paper; a line-type recording head for recording an image on the recording paper; means for forcing the recording head to press the recording paper against the recording roller; a first releasing mechanism for allowing relative movement of the recording head and the recording roller away from each other; a reading roller for feeding a document sheet; a reading head for reading information from the document sheet, the reading head being located near the recording head; means for forcing the reading head to press the document sheet against the reading roller; a second releasing mechanism for allowing relative movement of the reading head and the reading roller away from each other; and first and second side plates located respectively at opposite sides of the recording roller, the recording head, the reading roller, and the reading head; wherein the recording head has a length smaller than a length of the reading head. The recording head is closer to the first side plate than the second side plate, and the first releasing mechanism is located between the recording head and the second side plate.

A second aspect of this invention is based on the first aspect thereof, and provides a communication apparatus further comprising an apparatus body with a front face. An outlet is provided in an upper part of the front face of the apparatus body. Means are provided for feeding the recording paper from the recording roller toward the outlet along an approximately horizontal path, the reading roller and the reading head being located below the approximately horizontal path and in a front part of the apparatus body. An inlet is provided in a lower part of the front face of the apparatus body. Means are provided for feeding the document sheet via the inlet along an upward path, and a guide plate located above the reading head guides the recording paper to the outlet and guiding the document sheet to the outlet.

A third aspect of this invention is based on the second aspect thereof, and provides a communication apparatus wherein the second releasing mechanism comprises a rotatable release lever. Means are provided for allowing relative movement of the reading head and the reading roller away from each other in accordance with rotation of the release lever, the release lever being integral with the guide plate, and the guide plate uncovering a path of travel of the document sheet when the release lever is rotated to relatively move the reading head and the reading roller away from each other.

A fourth aspect of this invention provides a communication apparatus for information which comprises an apparatus body. A reading roller is located in a front part of the apparatus body. A reading head is provided for reading information from a document sheet. Means are provided for forcing the reading head to press the document sheet against the reading roller along a lateral direction. An inlet is provided in a lower part of a front face of the apparatus body and allowed the document sheet to be inserted into the apparatus body toward a place of contact between the reading roller and the reading head. An outlet is provided in an upper part of the front face of the apparatus body and a guide plate is provided for guiding the document sheet, which have passed the place of the contact between the reading roller and the reading head, toward the outlet. A releasing mechanism is provided for allowing relative movement of the reading head and the reading roller away from each other; wherein the releasing mechanism comprises a rotatable release lever, and means for allowing relative movement of the reading head and the reading roller away from each other in accordance with rotation of the release lever, the release lever being integral with the guide plate. The guide plate uncovers a path of travel of the document sheet when the release lever is rotated to relatively move the reading head and the reading roller away from each other.

A fifth aspect of this invention provides a communication apparatus for transmitting and receiving information which comprises a recording roller for feeding a recording paper; a line-type recording head for recording an image on the recording paper; means for forcing the recording head to press the recording paper against the recording roller; a recording-head retainer for retaining the recording head, the recording-head retainer being movable between a normal position where the recording head is pressed against the recording roller and a release position where the recording head is separate from the recording roller. A reading roller is provided for feeding a document sheet and a reading head reads information from the document sheet, the reading head being located near the recording head. Means are provided for forcing the reading head to press the document sheet against the reading roller. A reading-head retainer is provided for retaining the reading head, the reading-head retainer being movable between a normal position where the reading head is pressed against the reading roller and a release position where the reading head is separate from the reading roller. A common releasing mechanism is provided for allowing movement of the recording-head retainer to its release position and allowing movement of the reading-head retainer to its release position.

A sixth aspect of this invention is based on the fifth aspect thereof, and provides a communication apparatus wherein the common releasing mechanism comprises a rotatable release lever, means for moving the recording-head retainer to its release position when the release lever rotates from a first given position to a second given position, and means for moving the reading-head retainer to its release position when the release lever rotates from the second given position to a third given position.

A seventh aspect of this invention is based on the sixth aspect thereof, and provides a communication apparatus wherein the release lever has a projection which engages the recording-head retainer when the release lever moves to either the second given position or the third given position. The recording-head retainer has first and second grooves, the projection of the release lever falling into the first groove of the recording-head retainer when the release lever moves to the second given position, the projection of the release lever falling into the second groove of the recording-head retainer when the release lever moves to the third given position.

An eighth aspect of this invention provides a communication apparatus for information which comprises a paper feeding portion for feeding a document sheet; and a document-sheet stopper located at a position distant from the paper feeding portion by an interval smaller than a length of the document sheet, the document-sheet stopper limiting a position of a rear edge of the document sheet which is set so that a front edge of the document sheet reaches the paper feeding portion; wherein the document sheet is supported between the paper feeding portion and the document-sheet stopper while being curved.

A ninth aspect of this invention is based on the eighth aspect thereof, and provides a communication apparatus further comprising an apparatus body, the paper feeding portion being located in a front part of the apparatus body, the document-sheet stopper being located in front of the paper feeding portion.

DESCRIPTION OF THE PREFERRED EMBODIMENTS

First Embodiment

Figure 1:
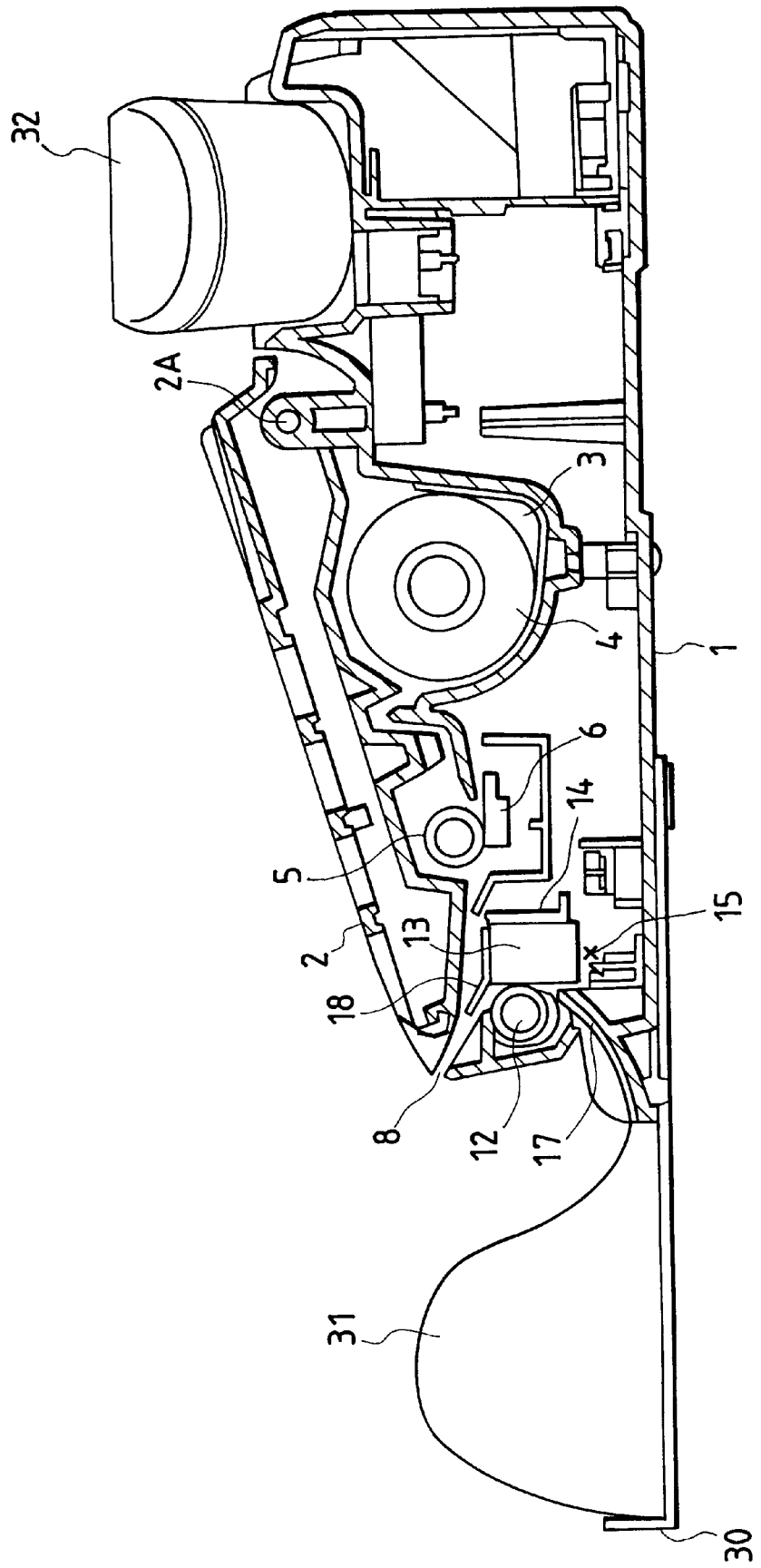
FIG. 1 is a sectional view of a communication apparatus according to a first embodiment of this invention.

With reference to FIGS. 1–7, a communication apparatus such as a facsimile apparatus includes a body 1 having an upper portion provided with a movable lid or a movable door 2. The lid 2 is rotatable about a shaft 2A into and out of a closed position. The upper portion of the apparatus body 1 is closed and opened when the lid 2 rotates into and out of its closed position respectively.

A central portion of the apparatus body 1 has a container or a holder 3 for accommodating a recording paper 4 in the form of a roll. A recording roller 5 is located in the apparatus body 1 between the recording-paper holder 3 and a front face of the apparatus body 1. The apparatus body 1 contains a line-type (linear-type) recording head 6 located below the recording roller 5. The recording head 6 is supported by a retainer 7. Normally, the recording head 6 is pressed against a lower surface of the recording roller 5 by a suitable mechanism. The recording head 6 uses, for example, a thermal head. A portion of the recording paper 4, which extends from the recording-paper holder 3, can pass through an area between the recording roller 5 and the recording head 6. The recording paper 4 can be pressed against the recording roller 5 by the recording head 6. As the recording roller 5 rotates, the recording paper 4 can be fed from the recording-paper holder 3 toward an outlet 8 along an approximately horizontal path while being scanned by the recording head 6. The outlet 8 extends in an upper part of the front face of the apparatus body 1.

Figure 6:
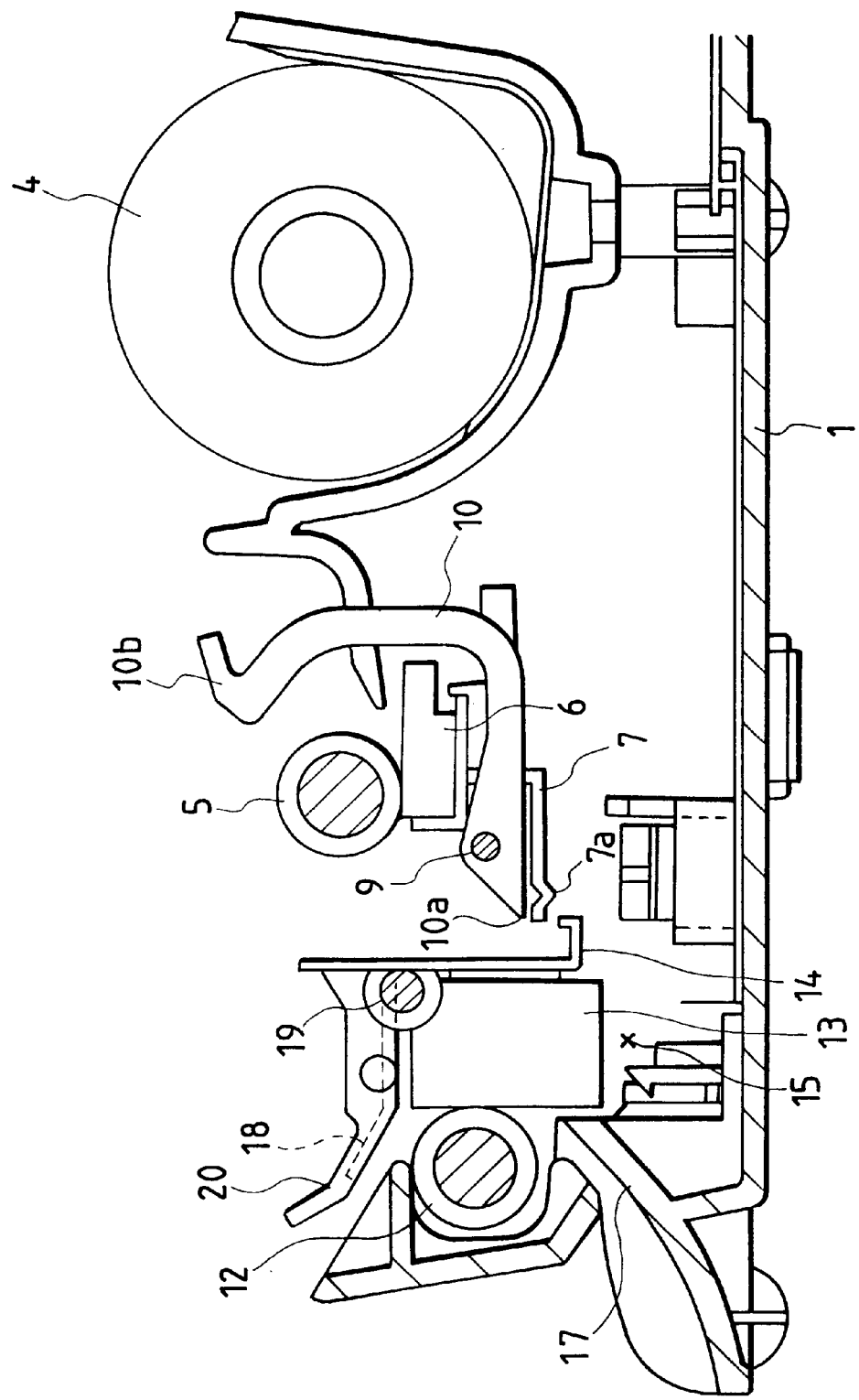
FIG. 6 is a sectional view of a portion of the communication apparatus in FIG. 1 in a condition where a recording head and a reading head are in their normal positions.

Normally, the recording-head retainer 7 is forced by a spring (not shown) to assume a position shown in FIG. 6 at which the recording head 6 is pressed against the recording roller 5. The recording-head retainer 7 can be moved or rotated down from the normal position to an ineffective position (a release position) shown in FIG. 7. When the recording-head retainer 7 is in its ineffective position, the recording head 6 assumes its released position and separates from the recording roller 5.

The apparatus body 1 contains an L-shaped release lever 10. The release lever 10 can rotate about a shaft 9 supported by a side plate 24A within the apparatus body 1. The release lever 10 can engage the recording-head retainer 7. The recording-head retainer 7 can be moved between the normal position (see FIG. 6) and the ineffective position (see FIG. 7) by rotating the release lever 10. One end of the release lever 10 has a projection 10a. The other end of the release lever 10 has a knob 10b. Normally, as shown in FIG. 6, the release lever 10 is in an inactive position separate from the recording-head retainer 7. The release lever 10 can be rotated from the inactive position to an active position shown in FIG. 7 by operating the knob 10b. As the release lever 10 is rotated from the inactive position (see FIG. 6) to the active position (see FIG. 7), the projection 10a meets the recording-head retainer 7 and then moves the recording-head retainer 7 down from its normal position to its ineffective position. As previously described, the recording head 6 moves into its released position and separates from the recording roller 5 when the recording-head retainer 7 assumes its ineffective position.

Figure 4:
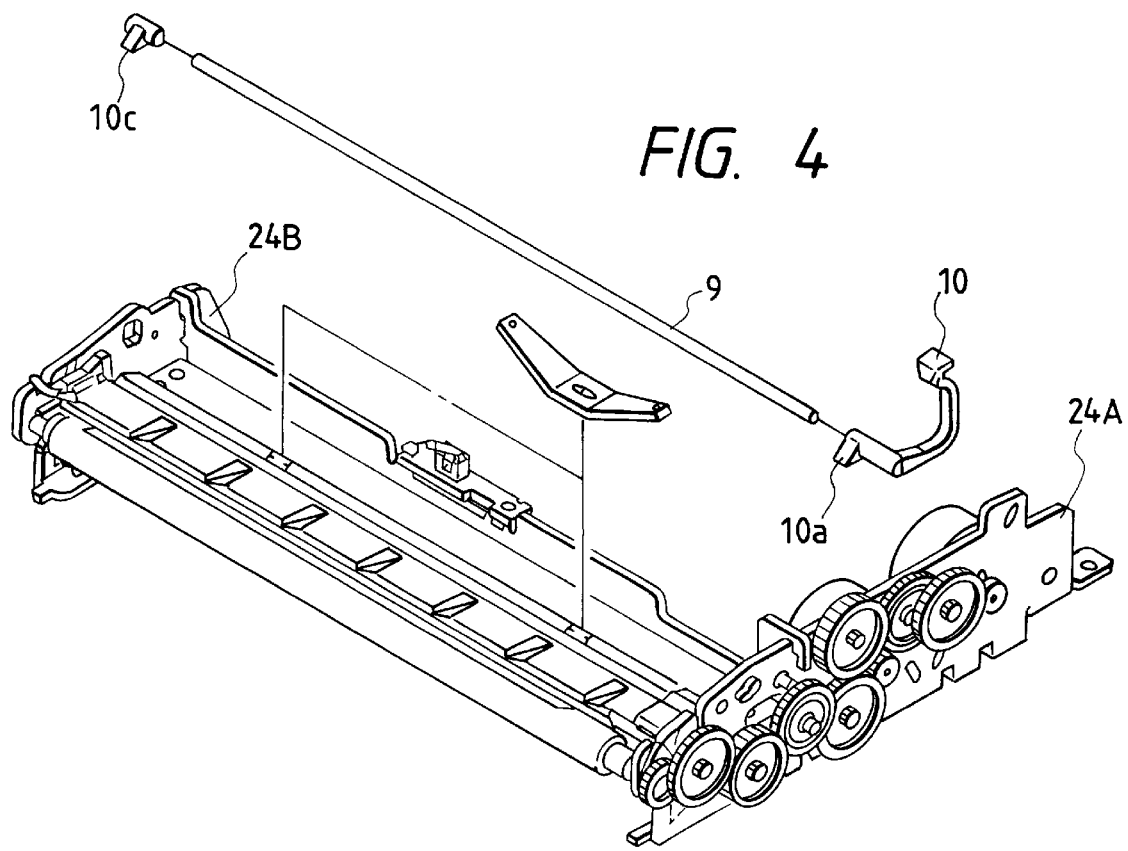
FIG. 4 is an exploded view in perspective of a portion of the communication apparatus in FIG. 1.

The recording-head retainer 7 has a groove 7a into which the projection 10a on the release lever 10 can fall. As the release lever 10 is rotated to its active position, the projection 10a thereon falls into the groove 7a in the recording-head retainer 7 (see FIG. 7). The connection between the projection 10a on the release lever 10 and the groove 7a in the recording-head retainer 7 enables the release lever 10 to be weakly or lightly locked in its active position. Thus, the connection between the projection 10a and the groove 7a holds the release lever 10 in its active position. As shown in FIG. 4, the release lever 10 is connected to one end of the shaft 9. A projection 10c similar to the projection 10a is connected to the other end of the shaft 9. The projection 10c moves together with the projection 10a. The projections 10a and 10c can depress opposite ends of the recording-head retainer 7, respectively.

The communication apparatus of FIGS. 1–7 may be modified into a structure in which the recording head 6 is fixed at a given position while the recording roller 5 can be moved between a normal position and an ineffective position. In this case, the recording roller 5 contacts with and separates from the recording head 6 when the recording roller 5 assumes the normal position and the ineffective position respectively. Furthermore, the modification structure is designed so that the recording roller 5 can moved between the normal position and the ineffective position by rotating the release lever 10.

The communication apparatus of FIGS. 1–7 includes a reading roller 12 disposed in a front portion of the apparatus body 1. The reading roller 12 serves to feed a document sheet 31 having information (image information) to be read or scanned. Normally, a line-type (linear-type) reading head 13 located in the apparatus body 1 presses the document sheet 31 against the reading roller 12 along a lateral direction with respect to the reading roller 12. As the document sheet 31 is fed by the reading roller 12, the reading head 13 reads the information therefrom. The reading head 13 extends near the recording head 6. The reading head 13 uses, for example, an image sensor of the contact type to reduce the size of the apparatus body 1.

Figure 7:
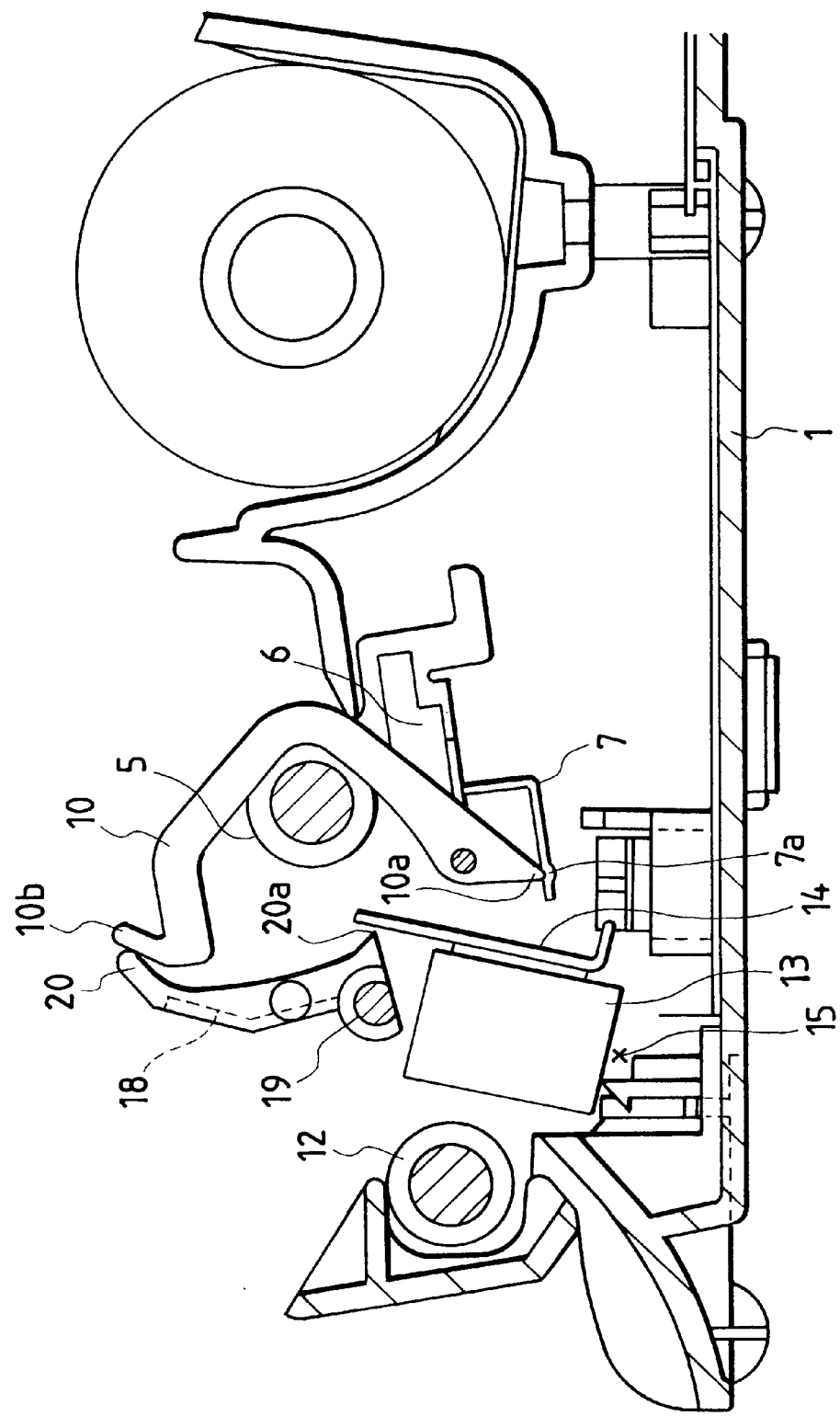
FIG. 7 is a sectional view of the apparatus portion in FIG. 6 but in a condition where the recording head and the reading head are in their released positions.

The apparatus body 1 contains a retainer 14 for supporting the reading head 13. The reading-head retainer 14 can rotate about a fulcrum or a shaft 15 extending in the apparatus body 1 below the reading head 13. Normally, the reading-head retainer 14 is forced by a spring (not shown) to assume a position shown in FIGS. 1 and 6 at which the reading head 13 is pressed against the reading roller 12. The reading-head retainer 14 can be moved or rotated from the normal position to an ineffective position (a release position) shown in FIG. 7. When the reading-head retainer 14 is in the ineffective position, the reading head 13 assumes its released position and separates from the reading roller 12 as shown in FIG. 7.

As best shown in FIG. 1, the reading roller 12 and the reading head 13 occupy a region below the path of the feed of the recording paper 4 by the recording roller 5. A lower part of the front face of the apparatus body 1 has an inlet 17 for the document sheet 31. The document sheet 31, which is inserted into the apparatus body 1 via the inlet 17, meets the reading roller 12 and the reading head 13. Then, the document sheet 31 can be fed upward by the reading roller 12. The apparatus body 1 contains a guide plate 18 extending above the reading head 13. The guide plate 18 serves as both a recording-paper guide and a document-sheet guide. Specifically, an upper surface of the guide plate 18 serves to guide the recording paper 4 from the recording roller 5 toward the outlet 8. A lower surface of the guide plate 18 serves to guide the document sheet 31 from the reading roller 12 toward the outlet 8. The guide plate 18 can rotate about a shaft 19 supported by the side plate 24A.

Figure 5:
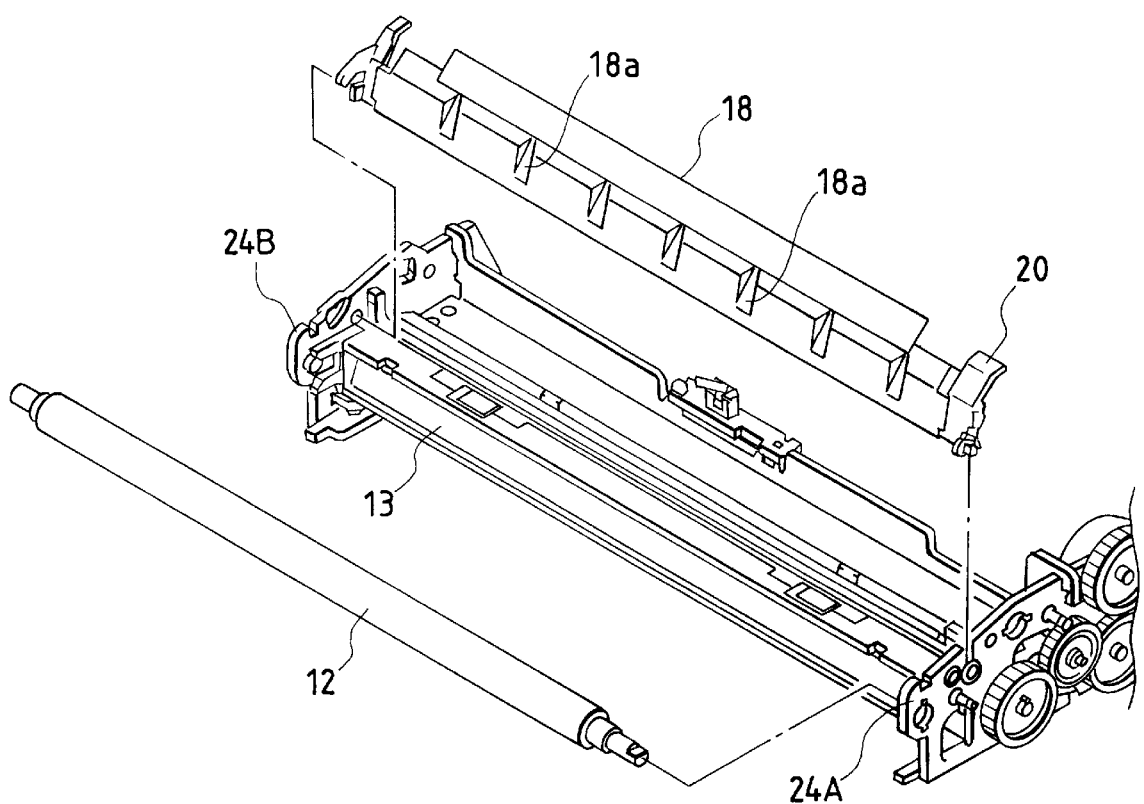
FIG. 5 is an exploded view in perspective of a portion of the communication apparatus in FIG. 1.

The apparatus body 1 contains a release lever 20 for moving the reading head 13 into and out of contact with the reading roller 12. The release lever 20 is integral with an end of the guide plate 18. Accordingly, the guide plate 18 and the release lever 20 can rotate together about the shaft 19. The release lever 20 is used to move both the reading-head retainer 14 and the guide plate 18. When the guide plate 18 and the release lever 20 assume their normal positions shown in FIGS. 1 and 6, the release lever 20 does not interfere with the reading-head retainer 14 so that the reading-head retainer 14 assumes its normal position. As previously described, the reading head 13 is pressed against the reading roller 12 when the reading-head retainer 14 is in its normal position. As the release lever 20 moves from its normal position (its inactive position) to its active position shown in FIG. 7, a projection 20a on an end of the release lever 20 forces the reading-head retainer 14 to rotate from its normal position to its ineffective position. As previously described, the reading head 13 assumes its releases position and separates from the reading roller 12 when the reading-head retainer 14 is in its ineffective position. The guide plate 18 falls into a position shown in FIG. 7 in accordance with the movement of the release lever 20 from its normal position (its inactive position) to its active position. When the guide plate 18 assumes the position shown in FIG. 7, the path of the feed of the document sheet 31 is uncovered and exposed. As best shown in FIG. 5, the release lever 20 is integral with a right-hand end of the guide plate 18. The release lever 20 has a shape which enables the operator (the user) to easily actuate the release lever 20. The document-sheet guiding surface of the guide plate 18 has ribs 18a spaced at equal intervals.

Figure 2:
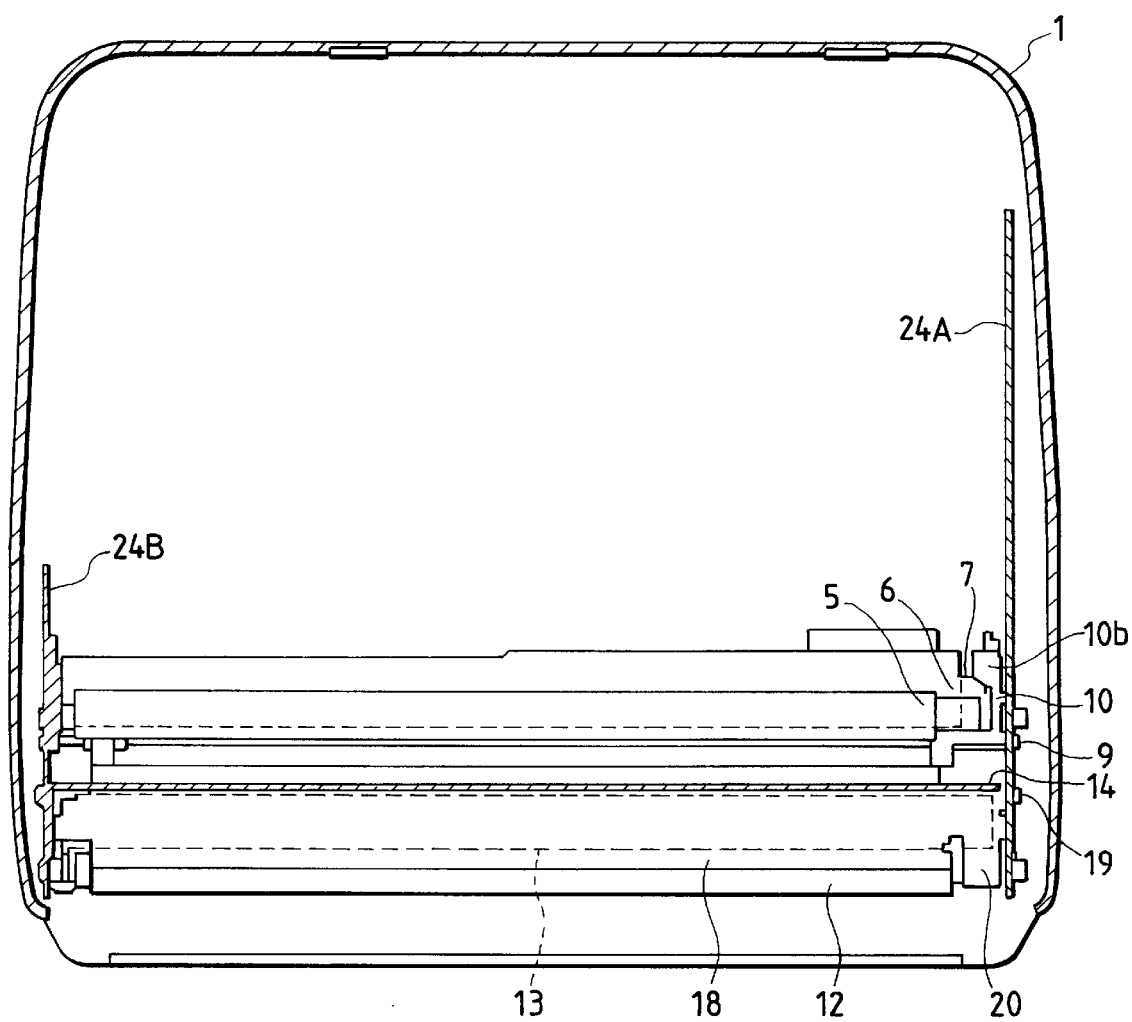
FIG. 2 is a plan view of the communication apparatus in FIG. 1.

As shown in FIG. 2, side plates 24A and 24B are located respectively at opposite sides of a region containing the recording roller 5, the recording head 6, the reading roller 12, and the reading head 13. The recording roller 5 and the reading roller 12 are supported by the side plates 24A and 24B. Gear trains (not shown) for driving the recording roller 5 and the reading roller 12 are located on an outer surface of the side plate 24A.

An effective information-recording width of the recording head 6 is equal to an effective information-reading width of the reading head 13. Generally, the recording head 6 is smaller than the reading head 13 in longitudinal dimension (axial dimension). In other words, the recording head 6 is shorter than the reading head 13. The center of the effective information-recording width of the recording head 6 is offset from or out of alignment with the center of the effective information-reading width of the reading head 13. Specifically, as shown in FIG. 2, the recording head 6 is closer to the left-hand side plate 24B than the right-hand side plate 24A. The left-hand end of the recording head 6 approximately aligns with the left-hand end of the reading head 13. It should be noted that the recording head 6 is shorter than the reading head 13. The right-hand end of the recording head 6 separates from the right-hand side plate 24A by a sufficient gap in which the release lever 10 is located.

The interval between the side plates 24A and 24B can be shorter than that available in an assumed structure in which the centers of the recording head 6 and the reading head 13 align with each other, and the release lever 10 is located between the recording head 6 and the side plate 24A. Accordingly, it is possible to miniaturize the apparatus body 1.

Figure 3:
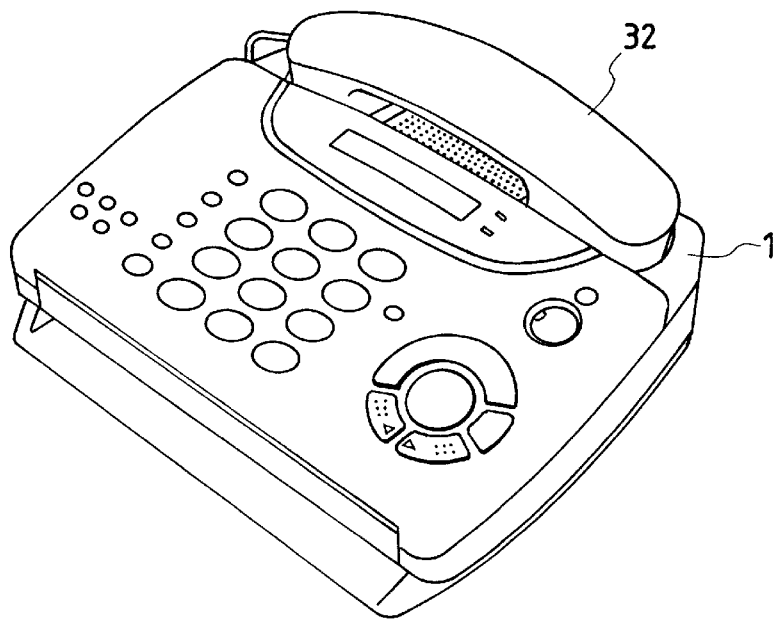
FIG. 3 is a perspective view of the communication apparatus in FIG. 1.

As shown in FIG. 3, the communication apparatus has a handset 32 which can be placed into and out of a rest position on the apparatus body 1. The longitudinal direction of the handset 32, which is in its rest position, is perpendicular to the direction of the movement of the recording paper 4 and the document sheet 31 out of the apparatus body 1. This arrangement enables the apparatus body 1 to be smaller since the width of the apparatus body 1 can be comparable to the longitudinal dimension of the reading head 13.

With reference to FIG. 1, a tray connected to the apparatus body 1 has an end provided with a stopper 30 for the document sheet 31. The interval between the document-sheet stopper 30 and the place of the contact between the reading roller 12 and the reading head 13 is smaller than the length of the document sheet 31 of a given size (for example, the A4 size). Generally, the document sheet 31 is set or placed in a manner such that the rear edge of the document sheet 31 engages the document-sheet stopper 30 while the front edge thereof reaches the place of the contact between the reading roller 12 and the reading head 13. In this case, the document sheet 31 curves as shown in FIG. 1. The document-sheet stopper 30 limits the position of the rear edge of the document sheet 31. The curved configuration of the document sheet 31 provides a narrower projectional area occupied by the document sheet 31. The curved configuration of the document sheet 31 causes a resiliency-based force which presses the front edge of the document sheet 31 against the place of the contact between the reading roller 12 and the reading head 13. Therefore, the document sheet 31 can be easily drawn into the area between the reading roller 12 and the reading head 13 when the reading roller 12 starts to rotate. Thus, the feed of the document sheet 31 can be surely and easily started.

It should be noted that the tray with the document-sheet stopper 30 may be movable into a region below the apparatus body 1. In this case, the tray with the document-sheet stopper 30 can be retracted from the state shown in FIG. 1.

The communication apparatus of FIGS. 1–7 operates as follows. During the receiving and printing mode of operation of the communication apparatus, the recording roller 5 rotates and thereby feeds the recording paper 4. Therefore, the recording paper 4 moves through the region between the recording roller 5 and the recording head 6 while being scanned by the recording head 6. The recording head 6 prints received information on the recording paper 4. The recording paper 4 with the printed information is driven forward by the recording roller 5, being guided by the upper surface of the guide plate 18 and being moved out of the apparatus body 1 via the outlet 8.

At an initial stage of the reading and transmitting mode of operation of the communication apparatus, a document sheet 31 having information (image information) to be read and transmitted is set in a manner such that the rear edge of the document sheet 31 engages the document-sheet stopper 30 while the front edge thereof reaches the place of the contact between the reading roller 12 and the reading head 13. Then, the reading roller 12 starts to rotate and thus feed the document sheet 31. Therefore, the document sheet 31 moves through the region between the reading roller 12 and the reading head 13 while being scanned by the reading head 13. The reading head 13 takes the information from the document sheet 31. The document sheet 31 which has passed the reading head 13 is changed in its travel direction by the guide plate 18 before being moved out of the apparatus body 1 via the outlet 8. An electrical portion of the communication apparatus transmits the information.

In the case where the recording paper 4 sticks during the receiving and printing mode of operation of the communication apparatus, or in the case where a new recording paper 4 is required to be set in the apparatus body 1, the operator (the user) moves the lid 2 from its closed position to open the upper portion of the apparatus body 1. Then, the operator (the user) rotates the release lever 10 from its inactive position (see FIG. 6) to its active position (see FIG. 7). As the release lever 10 is rotated from the inactive position (see FIG. 6) to the active position (see FIG. 7), the projection 10*a* on the release lever 10 meets the recording-head retainer 7 and then moves the recording-head retainer 7 down from its normal position to its ineffective position. As a result, the recording head 6 is separated from the recording roller 5, and the recording head 6 and the recording roller 5 are released from each other. Under these conditions, the operator (the user) can easily take a step of removing the sticking of the recording paper 4 or can easily set a new recording paper 4 in the apparatus body 1. Furthermore, under these conditions, the projection 10*a* on the release lever 10 extends into the groove 7*a* in the recording-head retainer 7 (see FIG. 7). The connection between the projection 10*a* on the release lever 10 and the groove 7*a* in the recording-head retainer 7 enables the release lever 10 to be weakly or lightly locked in its active position. Thus, the release lever 10 can be held in its active position even when the operator (the user) lets go of his or her hold of the release lever 10.

In the case where the document sheet 31 sticks during the reading and transmitting mode of operation of the communication apparatus, the operator (the user) moves the lid 2 from its closed position to open the upper portion of the apparatus body 1. Then, the operator (the user) rotates the release lever 20 from its inactive position (see FIG. 6) to its active position (see FIG. 7). As the release lever 20 is moved from its inactive position to its active position, the projection 20*a* on the release lever 20 forces the reading-head retainer 14 to rotate from its normal position to its ineffective position. As a result, the reading head 13 is separated from the reading roller 12, and the reading roller 12 and the reading head 13 are released from each other. The guide plate 18 falls into the position shown in FIG. 7 in accordance with the movement of the release lever 20 from its inactive position to its active position. Thus, the path of the feed of the document sheet 31 is uncovered and exposed. Under these conditions, the operator (the user) can easily take a step of removing the sticking of the document sheet 31.

Second Embodiment

Figure 8:
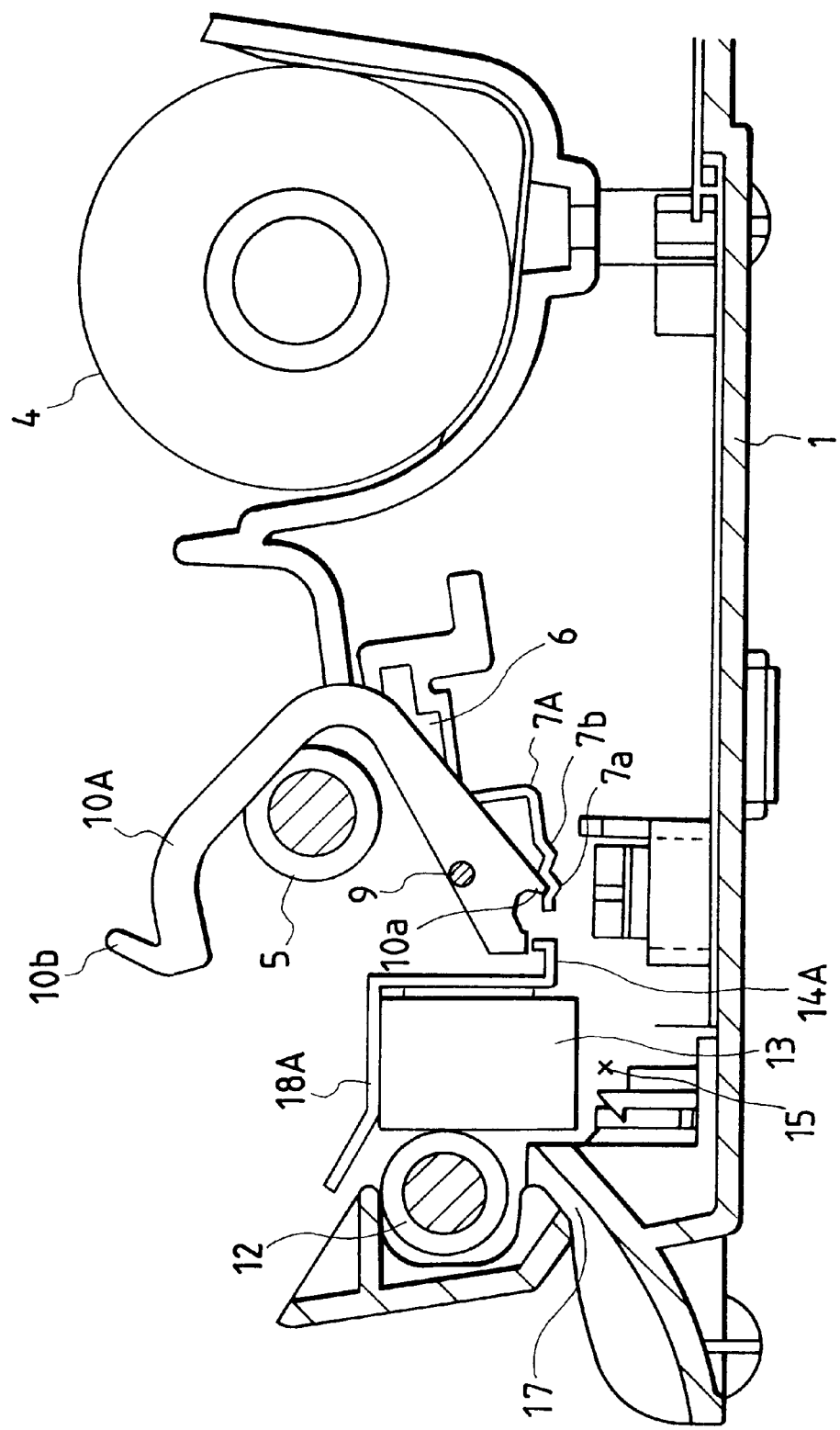
FIG. 8 is a sectional view of a portion of a communication apparatus in a certain condition according to a second embodiment of this invention.
Figure 9:
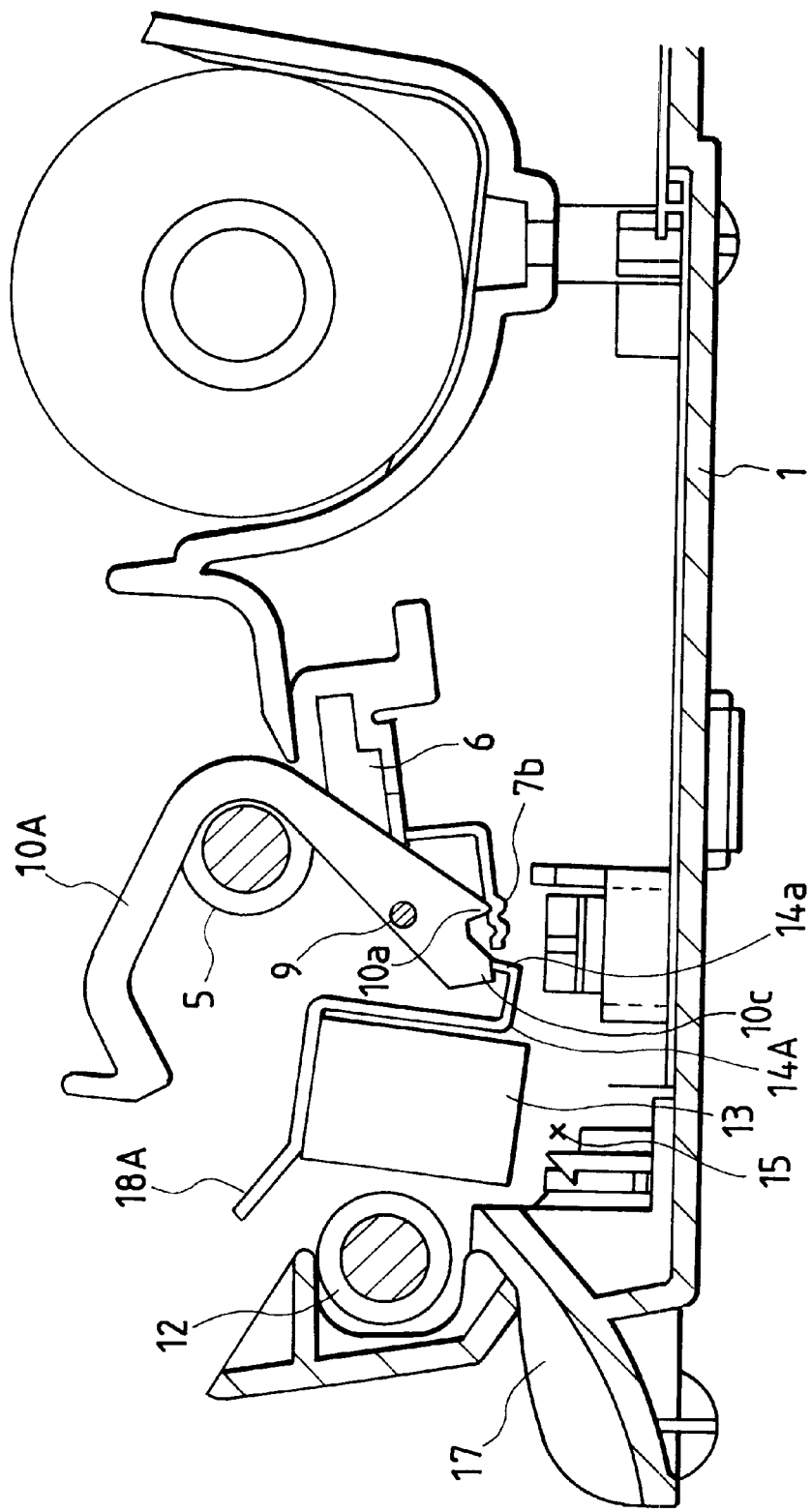
FIG. 9 is a sectional view of the apparatus portion in FIG. 8 but in another condition.

FIGS. 8 and 9 show a communication apparatus according to a second embodiment of this invention. The communication apparatus of FIGS. 8 and 9 is similar to the communication apparatus of FIGS. 1–7 except for design changes explained hereinafter. The communication apparatus of FIGS. 8 and 9 includes a rotatable retainer 7A for supporting a line-type (linear-type) recording head 6. The recording-head retainer 7A has a first groove 7*a*. Also, the recording-head retainer 7A has a second groove 7*b* near the first groove 7*a*.

The communication apparatus of FIGS. 8 and 9 includes a retainer 14A for supporting a reading head 13. The reading-head retainer 14A can rotate about a fulcrum or a shaft 15 extending below the reading head 13. A guide plate 18A is integral with the reading-head retainer 14A. The guide plate 18A extends above the reading head 13. An upper surface of the guide plate 18A serves as a recording-paper guide while a lower surface thereof serves as a document-sheet guide.

It should be noted that the release lever 20 (see FIGS. 2, 5, 6, and 7) is absent from the communication apparatus of FIGS. 8 and 9.

The communication apparatus of FIGS. 8 and 9 includes a common release lever 10A for moving both the recording-head retainer 7A and the reading-head retainer 14A. The common release lever 10A has a shape of a letter "L". The common release lever 10A can rotate about a shaft 9 supported by a side plate 24A (see FIG. 2). An end of the common release lever 10A has a first projection 10*a* which can fall into either the first groove 7*a* or the second groove 7*b* in the recording-head retainer 7A. Also, the end of the common release lever 10A has a second projection 10*c* near the first projection 10*a*. The common release lever 10A can change among an inactive position, a first active position (see FIG. 8), and a second active position (see FIG. 9). When the common release lever 10A rotates to its first active position, the first projection 10*a* thereon falls into the first groove 7a in the recording-head retainer 7A and the second projection 10c thereon remains out of contact with the reading-head retainer 14A as shown in FIG. 8. When the common release lever 10A rotates to its second active position, the first projection 10a thereon falls into the second groove 7b in the recording-head retainer 7A as shown in FIG. 9. At the same time, the second projection 10c thereon meets a projection 14a on the recording-head retainer 14A, moving the recording-head retainer 14A down from its normal position to its ineffective position (see FIG. 9).

During the normal mode of operation of the communication apparatus of FIGS. 8 and 9, the common release lever 10A is in its inactive position separate from both the recording-head retainer 7A and the reading-head retainer 14A.

In the case where a recording roller 5 and the recording head 6 are required to be released from each other, the operator (the user) rotates the common release lever 10A from its inactive position to its first active position shown in FIG. 8. As the common release lever 10A is rotated from its inactive position to its first active position, the projection 10a on the common release lever 10A meets the recording-head retainer 7A and then moves the recording-head retainer 7A down from its normal position so that the recording head 6 separates from the recording roller 5. In addition, the projection 10a on the common release lever 10A falls into the first groove 7a in the recording-head retainer 7A. The connection between the projection 10a on the common release lever 10A and the first groove 7a in the recording-head retainer 7A enables the common release lever 10A to be weakly or lightly locked in its first active position. Thus, the common release lever 10A can be held in its first active position even when the operator (the user) lets go of his or her hold of the common release lever 10A. While the common release lever 10A remains in its first active position, the projection 10a thereon keeps out of contact with the reading-head retainer 14A. Accordingly, in this case, the reading-head retainer 14A remains in its normal position where the reading-head 13 is pressed against a reading roller 12.

In the case where the reading roller 12 and the reading head 13 are required to be released from each other, the operator (the user) further rotates the common release lever 10A to its second active position shown in FIG. 9. As the common release lever 10A is rotated to its second active position, the projection 10a on the common release lever 10A moves out of the first groove 7a in the recording-head retainer 7A and then falls into the second groove 7b therein. During this period, the projection 10c on the common release lever 10A meets the projection 14a on the recording-head retainer 14A and then moves the recording-head retainer 14 down from its normal position to its ineffective position (see FIG. 9). The reading head 13 separates from the reading roller 12 when the recording-head retainer 14 assumes its ineffective position. The guide plate 18A falls into a position shown in FIG. 9 in accordance with the movement of the reading-head retainer 14A from its normal position to its ineffective position. Thus, the path of the feed of a document sheet is uncovered and exposed. On the other hand, the connection between the projection 10a on the common release lever 10A and the second groove 7b in the recording-head retainer 7A enables the common release lever 10A to be weakly or lightly locked in its second active position. Thus, the common release lever 10A can be held in its second active position even when the operator (the user) lets go of his or her hold of the common release lever 10A.

As understood from the previous description, a process of releasing only the recording head 6 and also a process of releasing both the recording head 6 and the reading head 13 can be implemented by actuating a single lever, that is, the common release lever 10A. The recording head 6 can be released while the reading head 13 remains unreleased. This design is advantageous in avoiding unnecessary execution of the release of the reading head 13.

What is claimed is:

1. A communication apparatus for transmitting and receiving information comprising:

a recording roller for feeding a recording paper;

a line-type recording head for recording an image on the recording paper;

means for forcing the recording head to press the recording paper against the recording roller;

a recording-head retainer for retaining the recording head, the recording-head retainer being movable between a normal position where the recording head is pressed against the recording roller and a release position where the recording head is separate from the recording roller;

a reading roller for feeding a document sheet;

a reading head for reading information from the document sheet, the reading head being located near the recording head;

means for forcing the reading head to press the document sheet against the reading roller;

a reading-head retainer for retaining the reading head the reading-head retainer being movable between a normal position where the reading head is pressed against the reading roller and a release position where the reading head is separate from the reading roller; and a common releasing mechanism for simultaneously allowing movement of the recording-head retainer to its release position and allowing movement of the reading-head retainer to its release position, wherein the common releasing mechanism comprises a rotatable release lever, means for moving the recording-head retainer to its release position when the release lever rotates from a first given position to a second given position, and means for moving the reading-head retainer to its release position when the release lever rotates from the second given position to a third given position.

2. A communication apparatus as recited in claim 1, wherein the release lever has a projection which engages the recording-head retainer when the release leer moves to either the second given position or the third given position, and the recording-head retainer has first and second grooves, the projection of the release lever falling into the first groove of the recording-head retainer when the release lever moves to the second given position, the projection of the release lever falling into the second groove of the recording-head retainer when the release lever moves to the third given position.

* * * * *

UNITED STATES PATENT AND TRADEMARK OFFICE
CERTIFICATE OF CORRECTION

PATENT NO. : 5,917,617
DATED : June 29, 1999
INVENTOR(S) : Yasuhiro Hatano et al.

It is certified that error appears in the above-identified patent and that said Letters Patent is hereby corrected as shown below:

<u>Title page,</u>
Item [73], Assignee: "Communications" should read -- Communication Systems --.

Signed and Sealed this

Eleventh Day of June, 2002

Attest:

Attesting Officer

JAMES E. ROGAN
*Director of the United States Patent and Trademark Office*